(12) United States Patent
Price et al.

(10) Patent No.: US 8,847,874 B2
(45) Date of Patent: Sep. 30, 2014

(54) SYSTEM AND METHOD FOR SEQUENTIAL DRIVING OF INFORMATION HANDLING SYSTEM DISPLAY BACKLIGHT LED STRINGS

(75) Inventors: Erin L. Price, Pflugerville, TX (US); Guangyong Zhu, Austin, TX (US); John Matthew Knadler, IV, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 2094 days.

(21) Appl. No.: 11/843,730

(22) Filed: Aug. 23, 2007

(65) Prior Publication Data

US 2009/0051629 A1    Feb. 26, 2009

(51) Int. Cl.
*G09G 3/36* (2006.01)
*G09G 3/32* (2006.01)
*H05B 33/08* (2006.01)

(52) U.S. Cl.
CPC ........ *H05B 33/0851* (2013.01); *H05B 33/0815* (2013.01); *Y02B 20/346* (2013.01); *H05B 33/0818* (2013.01)
USPC ............................................. 345/102; 345/82

(58) Field of Classification Search
CPC .......................... G09G 3/3406; G02F 1/13471
USPC ................... 345/102–104, 87, 82, 83; 349/74
See application file for complete search history.

(56) References Cited

U.S. PATENT DOCUMENTS

| | | | |
|---|---|---|---|
| 7,220,039 B2 | 5/2007 | Ahn et al. | 362/612 |
| 7,239,087 B2 | 7/2007 | Ball | 315/128 |
| 7,248,245 B2 | 7/2007 | Adachi et al. | 345/102 |
| 2003/0020677 A1* | 1/2003 | Nakano | 345/87 |
| 2005/0231459 A1* | 10/2005 | Furukawa | 345/102 |
| 2007/0176883 A1* | 8/2007 | Hsu et al. | 345/102 |

* cited by examiner

*Primary Examiner* — Kevin M Nguyen
(74) *Attorney, Agent, or Firm* — Terrile, Cannatti, Chambers & Holland, LLP; Robert W. Holland

(57) ABSTRACT

An information handling system display backlight illuminates an image with plural strings of LEDs driven by a backlight driver integrated circuit with pulse width modulation. A string detection module detects the number of active LED strings and divides the time period by number of active LED strings into an equal number of time delays or shifts so that the backlight driver sequentially turns on an LED string at a predetermined time period. The active number of LED strings is detected by reading a total number of LED strings from a management interface and subtracting from the total number any detected failed LED strings or any LED strings powered down to reduce power consumption.

20 Claims, 5 Drawing Sheets

SYSTEM AND METHOD FOR SEQUENTIAL DRIVING OF INFORMATION HANDLING SYSTEM DISPLAY BACKLIGHT LED STRINGS

BACKGROUND OF THE INVENTION

1. Field of the Invention

The present invention relates in general to the field of information handling system displays, and more particularly to a system and method for sequential driving of information handling system display backlight LED strings.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems have achieved performance levels which have encouraged end users to purchase portable systems as replacements for desktop systems. The higher performance levels offered by portable information handling systems generally result in greater power consumption, which reduces the operating time for battery operations. Portable information handling system displays, typically liquid crystal displays (LCDs), are often a significant consumer of battery power. LCDs present images by illuminating a backlight through a panel of liquid crystal pixels. The color of light that passes through the liquid crystals is altered by filters and the crystal state. Conventional LCDs use cold cathode fluorescent light (CCFL) to generate the backlight. Although CCFLs are generally energy efficient, recent improvements have made LEDs an attractive alternative to CCFLs as LCD backlights because LEDs are more energy efficient and operate on direct current. LEDs are available that produce white light (WLEDs) and that produce red, green and blue light (RGB LEDs) which combine to provide white light.

LED backlights are typically driven under the management of an integrated circuit (IC). Typically, the LEDs are arranged in strings with a backlight consisting of between four and six strings and each string having approximately ten LEDs. Although LEDs are powered by direct current, driver ICs generally use pulse width modulation (PWM) brightness dimming instead of analog dimming due to non-uniformity issues and color shift associated with analog dimming. However, when PWM dimming is implemented, high inrush currents and transients sometimes result from all of the LEDs turning on and off simultaneously. The inrush currents and transients can cause issues with electromagnetic interference (EMI) and acoustic noise and tend to require relatively high input and output capacitance be used for the LED driver. One solution is to sequentially drive the LED strings over a PWM time period so that the inrush currents and transients occur one string at a time and thus have a reduced impact. For example, some LED backlight drivers use a fixed time delay of a portion of the PWM period for the application of power at each LED string, such as $\frac{1}{8}^{th}$ of the PWM period. Other LED backlight drivers use a fixed time delay of a set amount of time, such as 20 ns. When the amount of delay between sequential dimming of LED strings is fixed, the ripple current varies with the duty cycle depending upon the number of strings used in the backlight.

SUMMARY OF THE INVENTION

Therefore a need has arisen for a system and method which adjusts LED sequencing time delay for the number of sequences performed, such as the number of LED strings in the backlight.

In accordance with the present invention, a system and method are provided which substantially reduce the disadvantages and problems associated with previous methods and systems for sequencing LEDs to vary an information handling system display backlight's brightness. The number of active LED strings of a display backlight is detected and applied to set timing of commands to the LED strings for adjusting display brightness, such as PWM commands to the strings over a cycle or time period.

More specifically, an information handling system display has plural sets of at least one LED disposed as plural strings to provide backlight for presenting an image. The LED strings are driven by a backlight driver integrated circuit that issues PWM commands over a cycle or time period. A string detection module detects the number of active LED strings, such as by retrieving the total number of strings from a management interface and subtracting failed or powered down strings. A string sequencing module applies the detected number of active LED strings to determine a sequencing time delay. The driver integrated circuit drives the backlight by sequentially powering LED strings over the cycle time period with the sequencing time delay between each PWM command to the individual LED strings. For example, the sequencing time delay is determined by dividing the time period by the number of active LED strings so that PWM commands to each of the individual LED strings are equally distributed across the time period of a PWM cycle.

The present invention provides a number of important technical advantages. One example of an important technical advantage is that the time period between driving sequential LED strings automatically adjusts to minimize the ripple effect. An optimal time shift or delay is used by dividing the time period of the PWM cycle by the number of active operating LED strings so that optimal operation continues even where an LED string has failed. Further, adaptability to the number of operational LED strings allows a single driver IC to run in multiple types of LCD panels, thus reducing the number of parts in an information handling system manufacturer's inventory to reduce design and manufacture complexity. In addition, optimal LED string sequencing time periods are adjusted in response to reduced power consumption modes of operation, such as when some of the LED strings are shut down to save power to extend battery charge life.

BRIEF DESCRIPTION OF THE DRAWINGS

The present invention may be better understood, and its numerous objects, features and advantages made apparent to FIG. 1 depicts a block diagram of a portable information handling system having a backlight of plural LED strings.

DETAILED DESCRIPTION

Adjusting the time delay for sequentially driving LED strings of an information handling system display backlight helps to minimize negative impacts on the information handling system from driving the LED strings. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
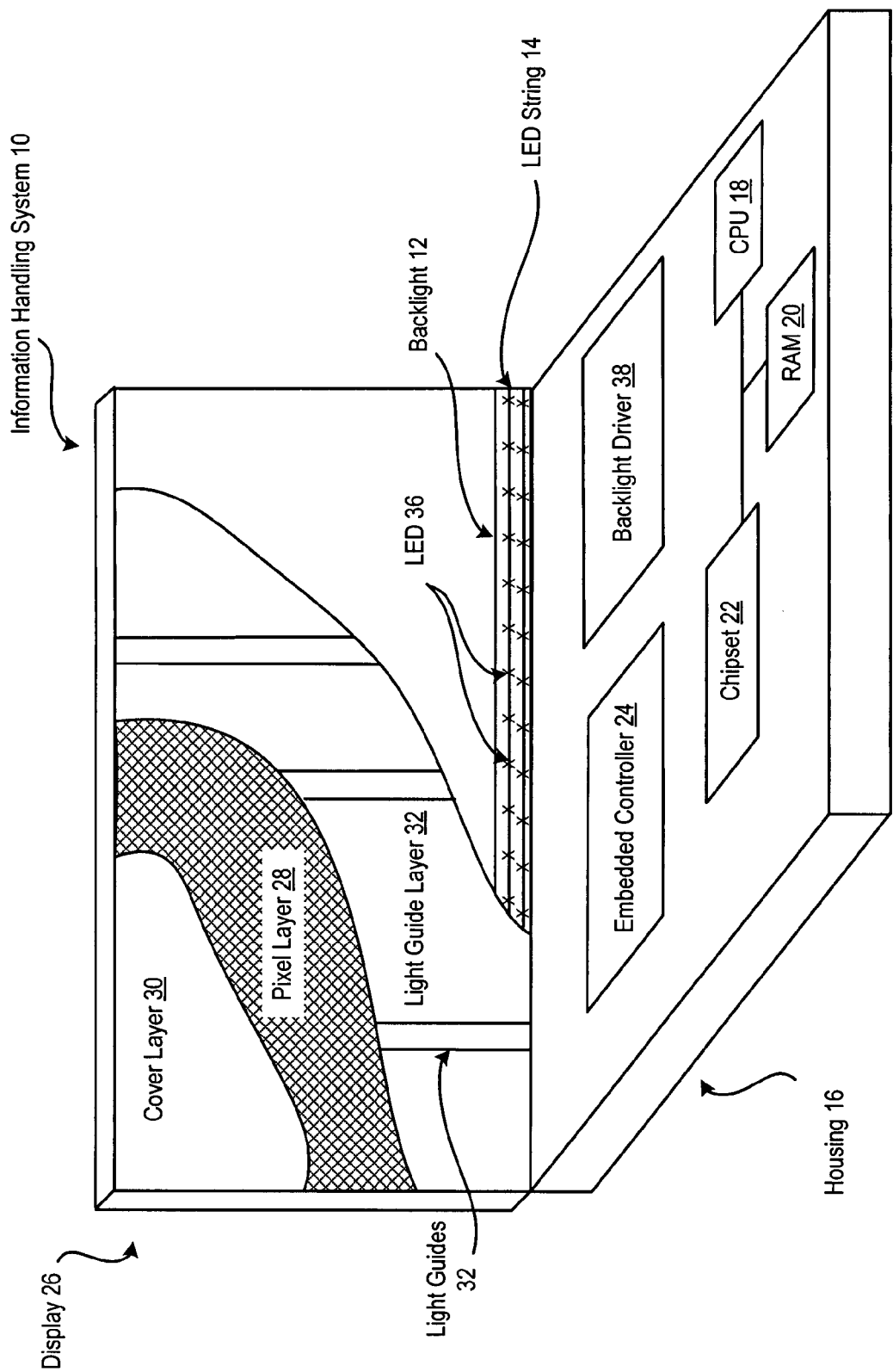

Referring now to FIG. 1, a block diagram depicts a portable information handling system 10 having a backlight 12 of plural LED strings 14. Information handling system 10 has plural processing components disposed in a housing 16 that cooperate to process information, such as a CPU 18, RAM 20, a chipset 22 and an embedded controller 24. Information generated by the processing components is presented as visual images at an integrated display 26 that is interfaced with the processing components, such as a LCD. Display 26 presents information as visible images by altering the translucence of liquid crystal material disposed in a pixel layer 28 that is protected under a cover layer 30. Pixel layer 28 is illuminated from behind by light guides 32 in a light guide layer 34, which guide light generated by backlight 12. Backlight 12 has plural LED strings 14, each of which has a set of one or more LEDs 36, such as WLEDs or RGB LEDs. LEDs 36 of LED strings 14 are illuminated by power provided from a backlight driver 38, which uses pulse width modulation (PWM) to adjust backlight brightness. In alternative embodiments, LED strings 14 are disposed in the place of a CCFL backlight, such as along the bottom portion of display 26, in multiple locations at the top and bottom of display 26, or distributed across display 26 in other arrangements, such as in Z or Y stacks.

Figure 2:
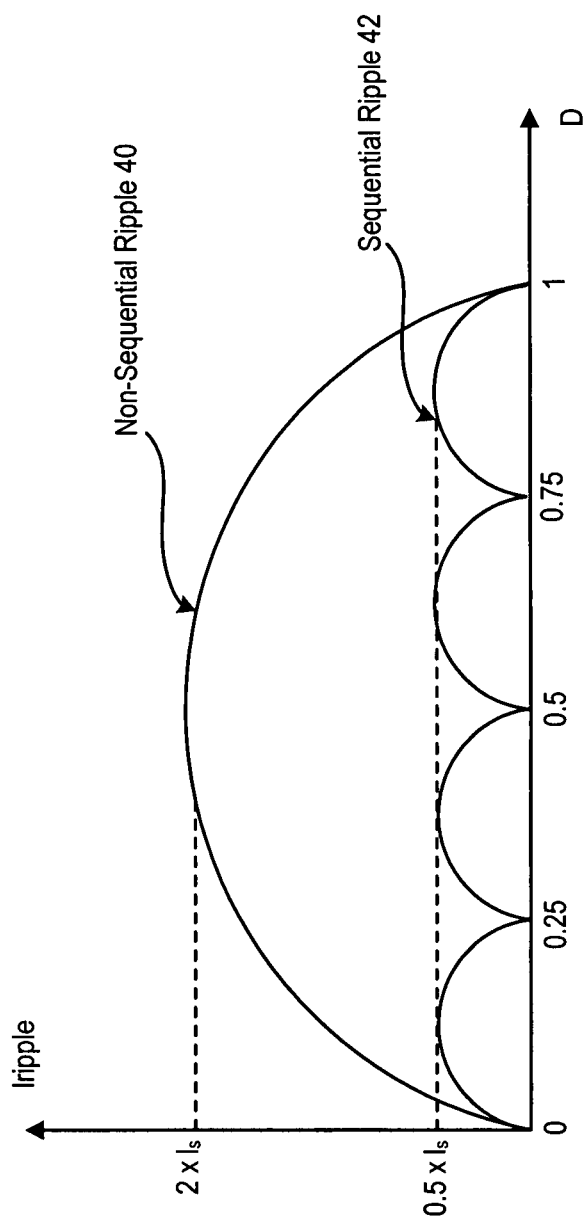
FIG. 2 depicts output capacitor ripple over a PWM dimming cycle using sequential and non-sequential control for a four LED string WLED backlight.
Figure 3:
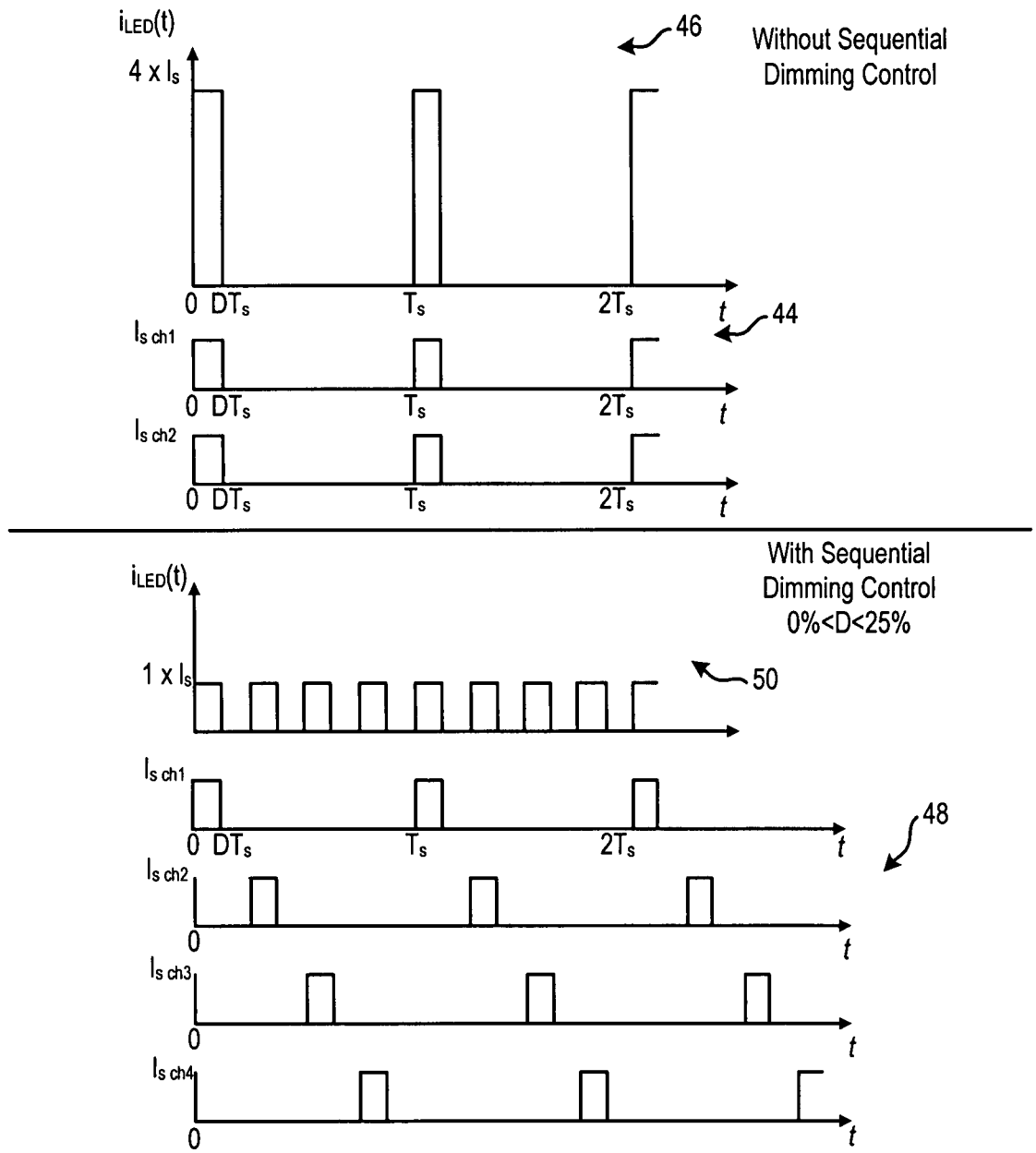
FIG. 3 depicts LED driver regulator output peak current waveform for driving four LED strings with and without sequential dimming control and individual string peak current.

Referring now to FIG. 2, output capacitor ripple over a PWM dimming cycle time period is depicted using sequential and non-sequential control for a four LED string WLED backlight. In the example depicted by FIG. 2, a single PWM command that dims all four WLEDs results in an output capacitor rms ripple current 40 of four times greater than that of a sequential rms ripple current. In contrast, four sequential PWM commands that dim each WLED backlight individually at evenly-distributed time period delays across the PWM cycle result in an output capacitor rms ripple 42 of one-quarter of that of a non-sequential command. Distributing the PWM commands evenly across the PWM cycle provides the lowest peak ripple current. FIG. 3 depicts LED driver regulator output peak current waveform for driving four LED strings with and without sequential dimming control and individual string peak current. In the example depicted by FIG. 3, the LED driver output current waveform 46 for four LED strings given a simultaneous PWM command reaches a value of four times the peak current 44 of an LED string. In contrast, distributing four PWM commands 48 equally across the time period provides an LED driver peak output current equal to the value of the current in an LED string.

Figure 4:
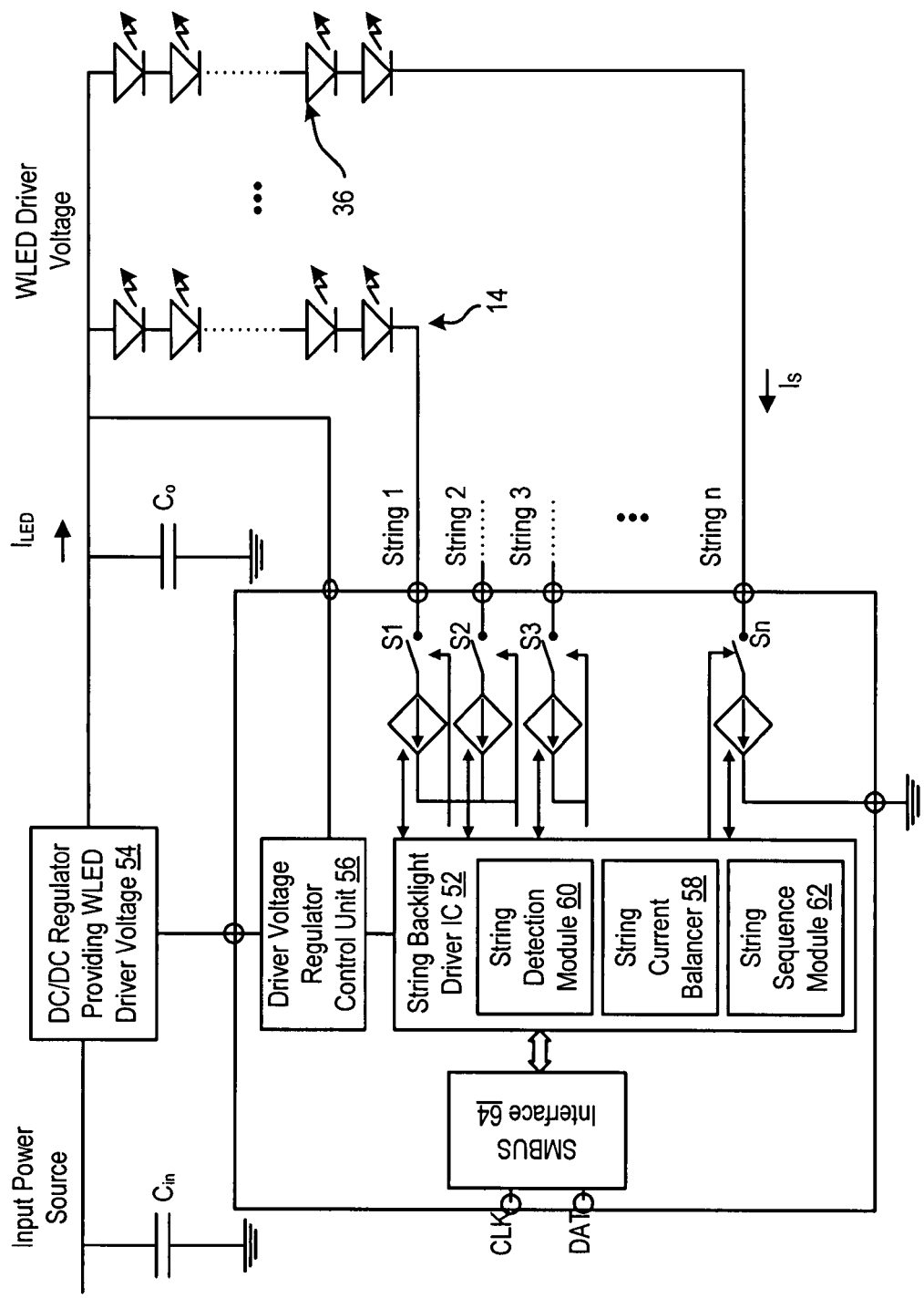
FIG. 4 depicts a circuit diagram of an LED string backlight driver that adjusts sequential PWM commands to distribute the commands evenly across the PWM cycle.

Referring now to FIG. 4, a circuit diagram depicts an LED string backlight driver 52 that adjusts sequential PWM commands to distribute the commands evenly across the PWM time period. LED string backlight driver 52 drives LED strings 14 of plural LEDs 36 by sequentially issuing PWM commands to sequentially turn on each LED string. A string current balancer 58 balances the current provided to strings one through n to maintain substantially constant illumination across LED strings 14. A string detection module 60 monitors string operations to determine the number of LED strings 14 that are active, i.e., providing illumination. String detection module 60 can alternatively determines the number of LED strings 14 by querying for that number through a management interface, such as SMBus interface 64. For example, the number of LED strings is stored in firmware, such as a BIOS, so that a common integrated circuit will work with information handling systems having different numbers of LED strings. String detection module 60 also detects whether any LED strings have failed and thus are not illuminating, such as with an open LED 36. String detection module 60 also detects whether any LED strings have failed and thus are not illuminating, such as with an open LED 36. For example, LED string failure is detected as set forth in U.S. patent application Ser. No. 11/554,701 entitled System and Method for Managing LED Backlight Performance in a Display naming Erin L. Price and Guangyong Zhu as inventors, which is incorporated herein by reference.

In addition, string detection module 60 detects strings that are intentionally powered down, such as to save power. In one embodiment, the number of active LED strings 14 is determined by subtracting the number of failed strings and the number of powered down strings from the total number of strings retrieved through management interface 64.

Once the number of active LED strings 14 is detected, a string sequencing module analyzes the number of active LED strings 14 to determine a sequencing time delay or time shift for providing PWM commands to individual LED strings 14. The sequencing time delay seeks to distribute PWM commands evenly across the time period so that current peaks across the circuit are minimized. For example, the sequencing time delay is the PWM time period divided by the number of active LED strings. Using the example set forth in FIG. 3, a four LED string configuration will have a sequencing time delay of 0.25 times the time period. A PWM command is sent to a first LED string at time zero, a second command is sent to a second string at 0.25 $T_s$, a third command is sent to a third LED string at 0.5 $T_s$, and a fourth command is sent to a fourth LED string at 0.75 $T_s$, with the cycle repeating at 1. If the active number of LED strings changes, such as due to a failure of an LED string or powering down of an LED string to conserve power, the sequencing time delay adjusts from 0.25 times the time period to 0.33 times the time period. In this manner, the impact of driving LED strings with PWM commands is managed to maintain a minimum.

Figure 5:
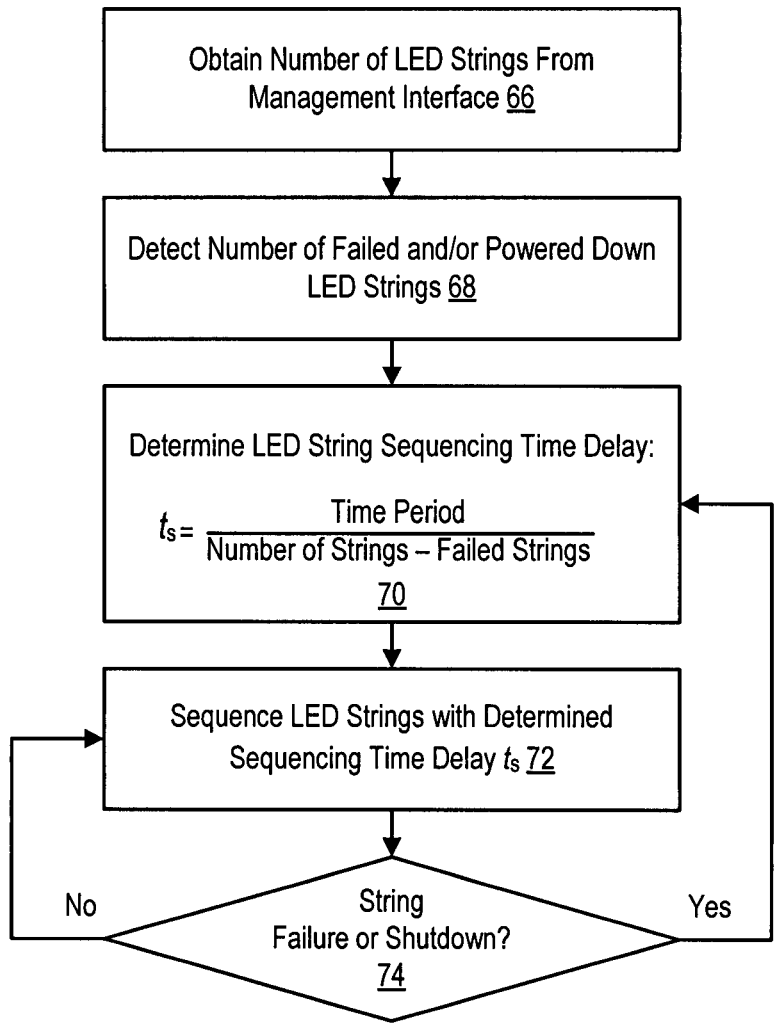
FIG. 5 depicts a flow diagram of a process for adjusting the time delay between sequential LED driver commands over a cycle based on the number of active LED strings in a backlight.

Referring now to FIG. 5, a flow diagram depicts a process for adjusting the time delay between sequential LED driver commands based on the number of active LED strings in a backlight. The process begins at step 66 by obtaining the number of LED strings on the information handling system from a management interface, such as an SMBus interface with a BIOS or other firmware. Alternatively, the number of LED strings may be determined based on the number of strings attached to the IC controller, such as where system level management is not desired. At step 68, the number of failed and/or powered down LED strings is detected. At step 70, the LED sequencing time delay is determined by dividing the time period by the total number of LED strings minus inactive LED strings, such as failed strings or powered down strings. At step 72, the LED string PWM commands for changing LED brightness are sequenced so that each LED string is turned on following the individual PWM commands issued at intervals of the sequencing time delay. At step 74, a periodic determination is made of whether an LED string failure or shutdown has occurred. If no failure or shutdown has occurred, the process returns to step 72 to continue sequencing with the determined sequencing time delay. If a failure or shutdown has occurred, the process returns to step 70 to determine an updated sequencing time delay adjusted for the new number of active LED strings.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components operable to process information;
   a display interfaced with the processing components and operable to present the information as visual images, the display having a backlight to illuminate the visual images, the backlight having plural sets of at least one LED; and
   a backlight driver operable to drive the sets of LEDs according to a cycle, the backlight driver further operable to determine the number of sets of LEDs being driven, to apply the determined number to determine a sequencing time delay and to sequentially drive the sets of LEDs based on the sequencing time delay.

2. The information handling system of claim 1 wherein the LEDs comprise RGB LEDs.

3. The information handling system of claim 1 wherein the LEDs comprise WLEDs.

4. The information handling system of claim 1 wherein the backlight driver determines the sequencing time delay by dividing the cycle by the number of sets of LEDs being driven.

5. The information handling system of claim 4 wherein the backlight driver is further operable to detect failure of a set of LEDs and to adjust the sequencing time delay according to the number of LEDs being driven after detecting the failure.

6. The information handling system of claim 1 wherein the backlight driver determines the number of sets of LEDs being driven by obtaining the number of sets of LEDs from a management interface.

7. The information handling system of claim 6 wherein the backlight driver determines the number of sets of LEDs being driven by subtracting a number of failed sets of LEDs from the number obtained from the management interface.

8. The information handling system of claim 6 wherein the backlight driver determines the number of sets of LEDs being driven by subtracting a number of sets of LEDs shut down to conserve power from the number obtained from the management interface.

9. The information handling system of claim 1 wherein the backlight driver drives the sets of LEDs with pulse width modulation.

10. A method for sequential driving of plural LED sets, the method comprising:
    detecting an active number of the LED sets;
    analyzing the active number of LED sets to determine a sequencing time delay for sequential driving of the LED sets; and
    sequentially driving the LED sets with the sequencing time delay between the driving of each LED set.

11. The method of claim 10 sequentially driving the LED sets comprises applying pulse width modulation to each LED set over a cycle.

12. The method of claim 10 wherein analyzing the active number of LED sets further comprises retrieving the number of LED sets from a management interface.

13. The method of claim 10 wherein analyzing the active number of LED sets further comprises detecting failed LED sets.

14. The method of claim 10 wherein analyzing the active number of LED sets further comprises detecting that one or more LED sets are powered down to conserve power.

15. The method of claim 10 wherein analyzing the active number of LED sets further comprises determining the sequencing time delay by dividing a cycle time period by the active number of LED sets.

16. The method of claim 10 wherein the LED sets comprise WLEDs disposed as LED strings to backlight an information handling system display.

17. A system for driving LED strings of a display backlight, the system comprising:
    a string detection module operable to detect a number of active LED strings of the display backlight; and
    a string sequence module operable to sequentially drive the LED strings over a time period, the time period broken into an evenly divided number of time delays equal to the detected number of active LED strings.

18. The system of claim 17 wherein the string detection module detects the number of active LED strings by querying a management interface.

19. The system of claim 17 wherein the string detection module detects the number of active LED strings by subtracting a number of detected failed LED strings from a total number of LED strings.

20. The system of claim 17 wherein the string detection module detects the number of active LED strings by subtracting a number of powered down LED strings from a total number of LED strings.

* * * * *